No. 611,722. Patented Oct. 4, 1898.
E. WESTON.
ELECTRICAL MEASURING INSTRUMENT.
(Application filed Jan. 10, 1898.)
(No Model.)
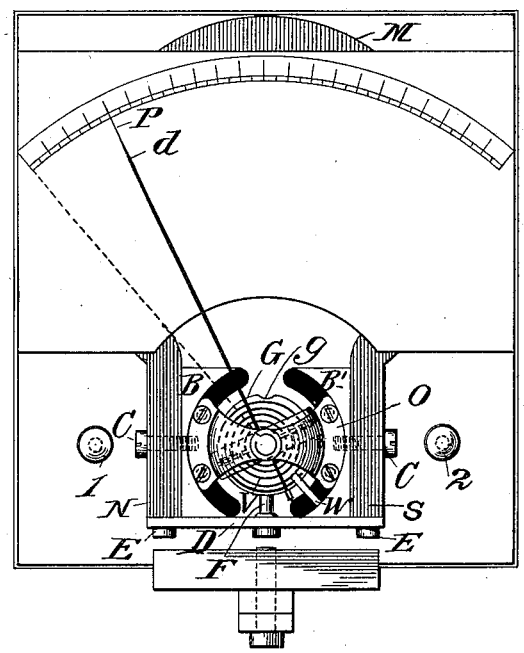
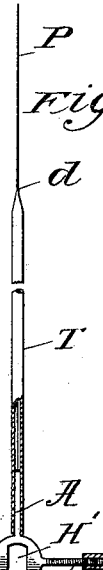
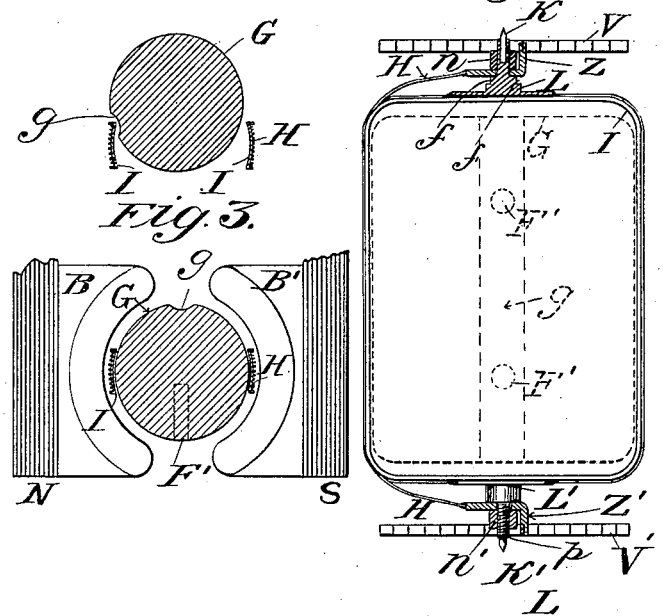
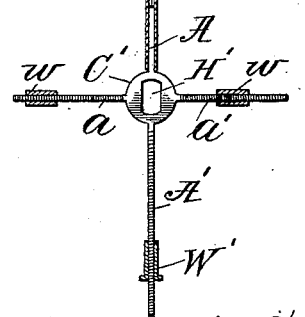
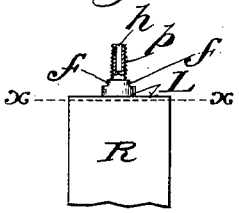
Witnesses
Edward E. Rowland
M. M. Robinson
Inventor
Edward Weston
By his Attorney
Charles J. Kintner

UNITED STATES PATENT OFFICE.

EDWARD WESTON, OF NEWARK, NEW JERSEY.

ELECTRICAL MEASURING INSTRUMENT.

SPECIFICATION forming part of Letters Patent No. 611,722, dated October 4, 1898.

Application filed January 10, 1898. Serial No. 666,144. (No model.)

*To all whom it may concern:*

Be it known that I, EDWARD WESTON, a subject of the Queen of Great Britain, residing at Newark, in the county of Essex and State of New Jersey, have made a new and useful Invention in Electrical Measuring Instruments, of which the following is a specification.

My invention is directed to improvements in details of construction upon prior inventions of mine—such, for instance, as is disclosed in United States Patents Nos. 392,387, 427,022, and 446,489, granted to me, respectively, on the 6th day of November, 1888, the 29th day of April, 1890, and the 17th day of February, 1891; and its objects are, first, to provide means for more accurately alining the pivot-pins which support the movable parts of the instrument, so that when in final position they shall be located in the mathematical axis of the movable coil which they pivotally sustain and that they may be readily renewed or replaced without disturbing the pivot-plates; second, to provide means for simplifying the adjustment between the spiral springs attached, respectively, to the rotary or movable coil and fixed parts of the instrument and also to afford better electrical conductivity between the ends of the coil and said parts; third, to so construct the rotary or movable coil and its supporting frame or spool that it will move freely in the smallest available air-space between the curvilinear pole-pieces of the instrument and the stationary magnetizable cylinder and that an increased magnetic flux will be attained; fourth, to so construct the stationary magnetizable cylinder that it may be secured in place within the delicately-constructed supporting frame or spool which sustains the rotary or movable coil without touching it and that it (the frame) will not be distorted during the assembling of the parts; fifth, to provide a novel form of index needle or hand which shall be as light as possible; sixth, to provide a novel means of accurately counterbalancing said needle and all of the movable parts, so that it (the needle) will remain in definite positions under all conditions of usage to which the instrument may be subjected, and, seventh, to provide a novel form of counterbalance or weight which may be adjusted upon the needle to the desired point and will remain in such position after so adjusted.

My invention will be fully understood by referring to the accompanying drawings, in which—

Figure 1 illustrates the well-known form of Weston electrical measuring instrument, such as is disclosed in the before-mentioned patents, with my improvements attached thereto. Fig. 2 is an enlarged side elevational view of the movable coil and its supporting frame or spool, together with my improved means for supporting and accurately alining the pivot-pins and accurately adjusting the relations between the supporting-frame, the oppositely-disposed retractile springs, and their attachments to the rigid or fixed frame of the instrument. Fig. 3 is a detail transverse sectional view taken through the movable coil, its supporting-frame, and the stationary magnetizable cylinder, the ends of the curvilinear pole-pieces being shown in plan view. Fig. 4 is a detail sectional view similar to Fig. 3, the pole-pieces not, however, being shown, said figure illustrating the manner of inserting the stationary magnetizable cylinder in position without distorting the movable coil and its supporting-frame. Fig. 5 is a part plan part horizontal sectional view of my novel form of index needle or hand, indicating also the manner of applying my novel counterbalances or weights thereon. Fig. 6 is a side elevational view of the end of a bar, preferably of aluminium, illustrating the manner of constructing my novel form of pivot-support. Fig. 7 is an end elevational view of the same, as seen looking at Fig. 6 from the top toward the bottom of the drawing; and Fig. 8 illustrates in enlarged sectional view my novel form of counterweight and the manner of applying the same to one of the radial counterbalancing-arms of the index needle or hand.

In my prior patents, Nos. 392,387 and 446,489, above referred to, the rotary or movable coil is supported upon a substantially rectangular-shaped frame and is in turn inclosed by a surrounding frame or mass of copper or other diamagnetic material for the purpose of rendering the instrument of a "dead-beat" nature in its operation. Such a structure, however, by reason of its weight, necessarily causes useless friction between the parts and also tends to give increased momentum to the needle after it is set in motion. It was with a view of overcoming these defects that I devised as light a supporting-frame for the coil as possible and made the index-needle and its attached parts correspondingly light, thereby avoiding as far as may be all of the evil effects of friction and inertia.

In constructing the supports for the pivot-pins in accordance with the before-mentioned patents it was also customary to screw-thread them and to drill pivot-holes entirely through the supports and provide interior screw-threads for the pivot-pins, which were finally secured by soldering. It was found, however, that owing to mechanical difficulties it was not always possible to so aline the pivot-pins that they would be located in the exact mathematical axis of the rotary or movable coil, a matter of importance where said coil and its supporting-frame are designed, as in the present instance, to rotate between the curvilinear pole-pieces B B' and a stationary magnetic cylinder G, having the smallest available space between such parts. Great difficulty was also experienced in adjusting the relative tension between the spirally-arranged conducting retractile springs, which were secured to the opposite ends of the rotary or movable coil and stationary parts of the instrument in such manner as to maintain the index-needle always at zero when no current was passing through the coil. Further, difficulty was encountered in properly counterbalancing the movable parts, so that when the instrument was placed in different positions the needle would remain stationary under all conditions of usage.

My present improvements effectually overcome all of the objectionable features, as will be understood by referring to the drawings in detail, in all of which like letters and figures of reference represent like parts wherever used.

Fig. 1 of the drawings represents a complete instrument with all of the present improvements attached. M represents the well-known form of magnet used in the Weston instruments, and having the usual curvilinear pole-pieces B B' secured thereto by screws C C, D being a non-magnetic bar secured to the ends of the pole-pieces by screws E E, said bar in turn sustaining, by screws F F, a stationary soft-iron or magnetizable cylinder G. O is one of the bridges or supports for the pivot-jewels and is secured by screws, as shown, to the pole-pieces B B', but insulated therefrom. 1 and 2 are the binding-posts, having the usual circuit connections (not shown) through the movable coil of the instrument and the spiral springs V V'.

Referring now to Figs. 2 to 8, inclusive, in which my present improvements are illustrated in detail, and first to Fig. 2, I represents a light non-magnetic frame of substantially rectangular form and of an interior curvilinear structure closely approximating the curvature of the magnetizable cylinder G, (see Fig. 4,) said frame being made, preferably, of thin aluminium and adapted to have wound thereon the rotary or movable coil H, of insulated wire. L and L' are pivot-supporting plates, which are constructed by first placing an aluminium bar or rod R (see Fig. 6) in a turning-lathe and turning off the lateral edges thereof, as shown in Fig. 7, then continuing the turning operation until a standard is left, then turning off a still further portion and drilling a hole $h$, so as to constitute a tubular standard $p$ for the pivot-pin K, then advancing a double milling-tool upon the opposite sides of the pivot-support $p$, so as to mill off the opposite faces at $ff$ and furnish upon this pivot-support a substantially rectangular bearing for sustaining the index needle or hand, then exteriorly screw-threading the standard $p$, as shown, and finally cutting off the entire plate L by a cutting-tool on the line $xx$. The structure thus described constitutes the entire pivot-plate for the upper end of the coil H and its sustaining-frame, the plate L' for the lower end of the coil being a duplicate thereof, save that the milled faces $ff$ are neglected. Pointed pivot-pins K and K' are then accurately constructed and forced endwise by a tool into position in the supports $p$, as shown in Fig. 2 of the drawings. The plates L and L' are then secured to the opposite ends of the coil and its supporting-frame by any well-known form of cement which will withstand such heat as instruments of this nature are liable to encounter, it being understood that the pivot-supports, and consequently the pivot-pins, are properly alined in the actual mathematical axis of the coil.

Referring now to Figs. 5 and 8 for a description of the index-needle and its attached parts, $d$ represents the entire needle, which is constructed by striking out of a thin sheet of metal, preferably aluminium, a cross having arms A A' $a$ $a'$, the rectangular-shaped opening H' being simultaneously struck out for the purpose of constituting the support of the needle upon the upper pivot-standard $p$ when placed about the faces $ff$, Figs. 2 and 7. The body of the needle is composed of a drawn tube T, of aluminium, adapted to have one end slipped over the arm A and secured thereto by a cement or by pressure, the outer or index portion of the needle being flattened, as shown at P, so that it will act as a retarding device as it moves through the air, and also in order that more delicate readings may be made upon the scale. The arms A' $a$ $a'$ are all screw-threaded, as shown, and provided with counterweights $w$ $w$ and W', the counterweight W' being larger than the weights $w$ $w$ for the purpose of balancing the tubular part T of the needle.

My novel form of counterweight is shown in detail in enlarged view in Fig. 8 of the drawings and is constructed by screw-threading interiorly one end of a short tubular piece of metal and then slitting the same longitudinally to a point approximating the other end thereof and finally squeezing the slitted parts together, so as to cause the screw-threads, when inserted in position upon the arms $a$ or $a'$, to secure the counterweight to said screw-threaded arms, the free or unthreaded portion of the tube acting as a guide to enable one to place it in position, it being a fact that where delicate counterweights of the nature indicated are used great difficulty is experienced in assembling the parts unless some guiding means be provided. This counterweight may, if preferred, be made by making the interior screw-threaded end of less diameter than the interior guiding end, in which event it would not be necessary to slit it, as described.

In Figs. 3 and 4 I have illustrated how I diminish the air-space between the pole-pieces and the magnetizable cylinder and also how I am enabled to insert the latter within the close-fitting or concentric surrounding frame I, which supports the rotary or movable coil H, without distorting said parts, it being obvious that where this cylinder approximates very closely the inner diameter of the frame there would be great danger of distorting the latter and its sustained coil if some such means be not provided for permitting of its free insertion. In order to properly effect this insertion, I cut a longitudinal groove $g$ on one side of the magnetizable cylinder G and opposite the screw-holes F' F', which receive the supporting-screws F F for supporting said magnetizable cylinder. The supporting-frame I is of substantially rectangular form and of curvilinear cross-section approximating the curvature of the pole-pieces and magnetizable cylinder G. It will be apparent upon inspection of Fig. 4 that when this magnetizable cylinder is placed so that one edge of the supporting-frame I rests in the groove $g$ said cylinder may be rotated into position without touching the frame at any point, and after once in position within the curved space it may then be rotated into the position shown in Figs. 1 and 3 and properly secured to the non-magnetic bar D by the screws F F. (See Fig. 1.)

Referring now to Fig. 2, Z and Z' represent rectangular metallic arms having holes about the middle of their length for securing them to the pivot-supports $p\ p$ and slits in their outer ends of such dimensions as to receive the inner ends of the conducting coiled springs V and V', and $n$ and $n'$ are nuts for permanently attaching said arms and the needle to the coil H after it (the needle) has been properly placed in position, with its opening H' about the faces $ff$ of the upper pivot-support L.

In assembling the parts after the pivot-supports have been properly alined, so that the pivot-pins K and K' are in the mathematical axis of the coil and the plates L L' permanently cemented in position, the needle T is then put in place upon the upper pivot-plate L and the rectangular arms Z and Z' are slipped over the screw-threaded standards $p\ p$, after which the nuts $n$ and $n'$ are screwed thereon and the opposite ends of the coil H are soldered to the lower lateral ends of the arms Z and Z'. The spiral springs V V' are now placed in position with their inner ends secured in the slits at the outer ends of the arms Z and Z'. The magnetizable cylinder G is rolled into position within the frame I in the manner shown in Fig. 4 and rotated until the holes F' F' are in proper position to permanently secure said cylinder. All of the movable parts, together with the magnetizable core, are now lowered into position between the field-poles B B', and the screws F F are secured in the magnetizable cylinder G. The bridges O O, which support the pivot-jewels for the pivot-bearings K and K', are then placed in position and the parts secured together in the same manner that the like parts are assembled in constructing the instruments disclosed in my prior patents above referred to. The spiral springs V and V' are now adjusted with relation to the slots in the stationary arms W at the opposite ends of the pole-pieces B and B', and the counterweights $w\ w$ and W' are adjusted so as to effectually counterbalance the movable parts for all possible positions of the instrument. The circuit connections are then effected from the binding-posts 1 and 2 to and through conductors (not shown) and the spiral springs V V' in the same manner disclosed in my prior patents above referred to.

Although I have hereinbefore described my improvements as particularly applicable to electrical measuring instruments such as are described in my prior patents above referred to, I wish it understood that a number of the details of construction are applicable to electrical measuring instruments generally and also to instruments of precision wherein light parts and delicacy of operation are required in connection with index needles or hands, and my claims hereinafter are to be construed as generic in so far as the details enumerated therein may be applied generally in the art of indicating instruments, whether electrical or otherwise.

Having thus described my invention, what I claim, and desire to secure by Letters Patent of the United States, is—

1. In an electrical measuring instrument provided with a movable coil, pivot-supporting plates having axially-drilled holes, in combination with pivot-pins or bearings secured therein by forcing them endwise, substantially as described.

2. In an electrical measuring instrument provided with a movable coil, pivot-supporting plates having axially-drilled holes in their outer ends and accurately-turned pivot-pins or bearings forced therein, said supporting-plates being secured to the opposite ends of the coil with the pivot-pins or bearings located in the mathematical axis of the coil, substantially as described.

3. In an electrical measuring instrument provided with a movable coil, a pivot-supporting plate having an axially-drilled hole in its outer end and a pivot-pin or bearing secured therein, the opposite sides of said plate being provided with flat surfaces for the purpose of securing an index-needle thereto, substantially as described.

4. In an electrical measuring instrument provided with a movable coil, pivot-supporting plates secured thereto, in combination with metallic arms detachably secured to said plates and soldered respectively to the opposite ends of the coil, together with spiral springs and means for securing the same to the free ends of the aforesaid arms, substantially as described.

5. In an electrical measuring instrument provided with a movable coil, pivot-supporting plates secured thereto, two rectangular metallic arms detachably secured to said pivot-plates by nuts and soldered respectively to the opposite ends of the coil, the outer ends of said arms being provided with slits adapted to receive the ends of spiral springs, substantially as described.

6. A pivot-supporting plate for use in electrical measuring instruments constructed of a single piece of metal having a tubular standard screw-threaded exteriorly, in combination with a pivot-pin inserted in said standard and a screw-threaded nut adapted to bind or hold in position the index-hand of the instrument and the conducting terminals of the coil to which said plate is secured, substantially as described.

7. A pivot-supporting plate for use in electrical measuring instruments having a tubular standard exteriorly screw-threaded and flattened on its opposite sides for the purpose of receiving an indicating hand or needle, in combination with adjustable means for securing one end of a spiral spring thereto, together with a nut adapted to fit the screw-threaded portion of said standard and firmly secure all of said parts together in a definite position with relation to the movable parts of the instrument, substantially as described.

8. An electrical measuring instrument provided with pivot-supporting plates permanently secured to the movable part of the instrument in a definite position, in combination with detachable or removable pivot-pins secured to said plates, substantially as described.

9. An electrical measuring instrument provided with a magnetizable cylinder located within a substantially rectangular-shaped movable coil closely approximating in diameter and curvature the cylinder, said cylinder having a groove upon one side for permitting its insertion into the coil, substantially as described.

10. An electrical measuring instrument provided with a movable coil supported by a frame having curvilinear walls, in combination with a magnetizable cylinder having a diameter closely approximating that of the frame, said cylinder being provided with a groove on one side for permitting its insertion into the frame, substantially as described.

11. An index needle or hand consisting of a supporting part having radially-disposed arms and a central opening for securing the entire needle to the pivot-support of an instrument, in combination with a tubular body part secured to one of said arms and counterweights adjustably secured to the other arms, substantially as described.

12. An index needle or hand consisting of a supporting part having a central opening for securing it to the pivot-support of an instrument, and a body part secured to the supporting part, in combination with adjustable counterweights so disposed with relation to the body part that the entire needle when secured in place will remain stationary when the instrument is caused to assume different positions, substantially as described.

13. An index needle or hand for an electrical measuring instrument consisting of a supporting part struck out of a thin sheet of metal and having radially-disposed arms and a central opening for supporting the needle, in combination with a tubular pointer secured to one of said arms and flattened at its free end, together with counterweights secured to the remaining arms, substantially as described.

14. An index needle or hand for an electrical measuring instrument consisting of a supporting part struck out of a thin sheet of aluminium and having radially-disposed arms and a central opening for supporting the needle, in combination with a tubular pointer secured to one of said arms and flattened at its free end, together with counterweights secured to the remaining arms, substantially as described.

15. An index needle or hand for an electrical measuring instrument consisting of a supporting part having three or more radially-disposed arms and a central opening for securing the needle to the movable part of the instrument, one of said arms being adapted to secure a tubular index-hand, and the others being screw-threaded and provided with correspondingly-screw-threaded counterweights, substantially as described.

16. A counterweight for index needles or hands consisting of a short metallic tube interiorly screw-threaded at one end, the opposite interior end thereof being of greater diameter than the screw-threaded portion whereby it may act as a guiding means for securing the counterweight upon a screw-threaded support, substantially as described.

17. A counterweight for index needles or hands consisting of a short metallic tube screw-threaded interiorly at one end and slitted longitudinally to a point approximating the other end thereof, substantially as described.

18. A counterweight for index needles or hands consisting of a short metallic tube screw-threaded interiorly at one end and slitted longitudinally to a point approximating the other end thereof, said slitted part being afterward squeezed together, substantially as described.

19. An index needle or hand for an electrical measuring instrument consisting of a supporting part having an opening for securing it to the movable part of the instrument, and three or more radially-disposed arms upon one of which is secured a body part or pointer, the remaining arms being screw-threaded, in combination with counterweights consisting of short tubular pieces of metal each screw-threaded interiorly at one end and slitted longitudinally in the direction of its length approximating the other end thereof, said counterweights being secured in position upon the ends of the radial arms in substantially the manner shown and described.

In testimony whereof I have hereunto subscribed my name this 5th day of January, 1898.

EDWARD WESTON.

Witnesses:
 C. J. KINTNER,
 W. C. WESTON.